United States Patent [19]

Kurata et al.

[11] 4,091,887
[45] May 30, 1978

[54] POWER UNIT FOR A MOTOR CYCLE

[75] Inventors: Noboru Kurata, Kamifukuoka; Kuniyuki Yamamoto, Kodaira, both of Japan

[73] Assignee: Honda Giken Kogyo Kabushiki Kaisha, Tokyo, Japan

[21] Appl. No.: 750,894

[22] Filed: Dec. 15, 1976

[51] Int. Cl.² .............................................. B62K 25/06
[52] U.S. Cl. ........................... 180/33 A; 123/179 SE; 180/33 B; 280/284
[58] Field of Search ................ 180/33 A, 33 B, 33 R, 180/32; 280/284; 123/179 SE, 185 R, 185 BA

[56] References Cited

U.S. PATENT DOCUMENTS

| | | | |
|---|---|---|---|
| 3,270,732 | 9/1966 | Harkness | 123/185 BA |
| 4,019,594 | 4/1977 | Koyama | 180/33 |

FOREIGN PATENT DOCUMENTS

| | | | |
|---|---|---|---|
| 831,375 | 3/1960 | United Kingdom | 180/33 R |
| 1,010,822 | 11/1965 | United Kingdom | 180/33 R |

*Primary Examiner*—Joseph F. Peters, Jr.
*Assistant Examiner*—Donn Mc Giehan

*Attorney, Agent, or Firm*—Haseltine, Lake & Waters

[57] ABSTRACT

A power unit for a motor-cycle of a type having a power transmission case which supports at the rear end thereof a rear axle and which is integrally joined together at one end of a crank case of an engine, wherein the power transmission case is constituted by an inner half directly connected to the crank case and an outer half separably connected to the inner half, the rear axle being fitted onto the inner half of the power transmission case, a driving power transmission mechanism is disposed in the inner half to connect the rear axle and a crank shaft of the engine. A pedal shaft having an engine starting pedal connected at one end thereof and an engine starting shaft adjacent to the crank shaft on the same axis is fitted onto the outer half of the power transmission case. A starting power transmission mechanism is disposed in the outer half to connect the crank shaft and the engine starting shaft. A driving member and a driven member of an over-running clutch for starting which are engaged with each other at the time of coupling of the inner and outer halves of the power transmission case are provided at the opposing ends of each of the starting shaft and the crank shaft.

8 Claims, 7 Drawing Figures

POWER UNIT FOR A MOTOR CYCLE

BACKGROUND OF THE INVENTION

This invention relates to a power unit for a motor-cycle, and, more particularly, it is concerned with a power unit for a motor-cycle of a construction, in which a power transmission case which supports at the rear end thereof the rear axle is integrally and connectively provided at one end of a crank case of a motor-cycle engine, and a starting power transmission mechanism to drive the rear axle of the motor-cycle is accommodated in the power transmission case.

It is a principal object of the present invention to provide a power unit for a motor-cycle of the above-described type, in which the power transmission case is divided into the left and right halves, a driving power transmission mechanism being disposed in one of the case halves, and a starting power transmission mechanism being disposed in the other of the case halves so that a crank shaft of the motor-cycle engine and the starting power transmission mechanism may be connected at the time of joining both case halves, thereby making it possible to assemble and disassemble the driving power transmission mechanism and the starting power transmission mechanism individually and separately, and thereby facilitating the assembly and maintenance of the power unit as a whole.

It is another object of the present invention to provide a power unit for a motor-cycle of the above-described type, which is easy in the starting operation and is high in its durability, and in which a certain definite force is accumulated in a spiral spring by swing motions of a pedal shaft, with the accumulated spring force of which cranking of the motor-cycle is performed, then, by restricting the winding quantity and the unwinding quantity of the spiral spring with the aid of a buffer member provided on the power unit, any excessive winding action to, impact due to the release onto, or breakage due to reverse rotation of, the spiral spring as well as separation of its tip end parts from their fixing member can be prevented.

According to the present invention, briefly stated, there is provided a power unit for a motor-cycle of a type having a power transmission case which supports at the rear end thereof a rear axle and which is integrally joined together at one end of a crank case of an engine, wherein the power transmission case is constituted with an inner half directly connected to the crank case and an outer half to be separably connected to the inner half, the rear axle is fitted onto the inner half of the power transmission case, and, at the same time, a driving power transmission mechanism is disposed in the inner half to connect the rear axle and a crank shaft of the engine, a pedal shaft having an engine starting pedal connected at one end thereof and an engine starting shaft adjacent to the crank shaft on the same axis is fitted onto the outer half of the power transmission case, and, at the same time, a starting power transmission mechanism is disposed in the outer half to connect the crank shaft and the engine starting shaft, and a driving member and a driven member of an over-running clutch for starting which are engaged each other at the time of coupling of the inner and outer halves of the power transmission case is provided at the opposing ends of each of the starting shaft and the crank shaft.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE ACCOMPANYING DRAWINGS

Specific embodiments of the present invention have been chosen for the purposes of illustration and description, and are shown in the accompanying drawings, forming a part of the specification, wherein.

DETAILED DESCRIPTION OF PREFERRED EMBODIMENTS

In the following, the present invention will be explained in reference to a preferred embodiment thereof.

Referring to FIGS. 1, 2, 3, 4, 5, 6, and 7, it is seen that a pair of left and right supporting brackets S, S are fixedly provided at the lower center part of a frame F of a body of the motor-cycle where it is bent. To these brackets S, S, there is supported the front part of a power unit P for the motor-cycle by a supporting bolt $B_1$ in a freely oscillatable manner in the up and down directions. Between the rear part of the power unit P and the upper rear end part of the vehicle body frame F, there is connected a conventional buffer device D of a telescopic type provided with a suspension spring C by means of connecting bolts $B_2$ and $B_3$.

Figure 1:
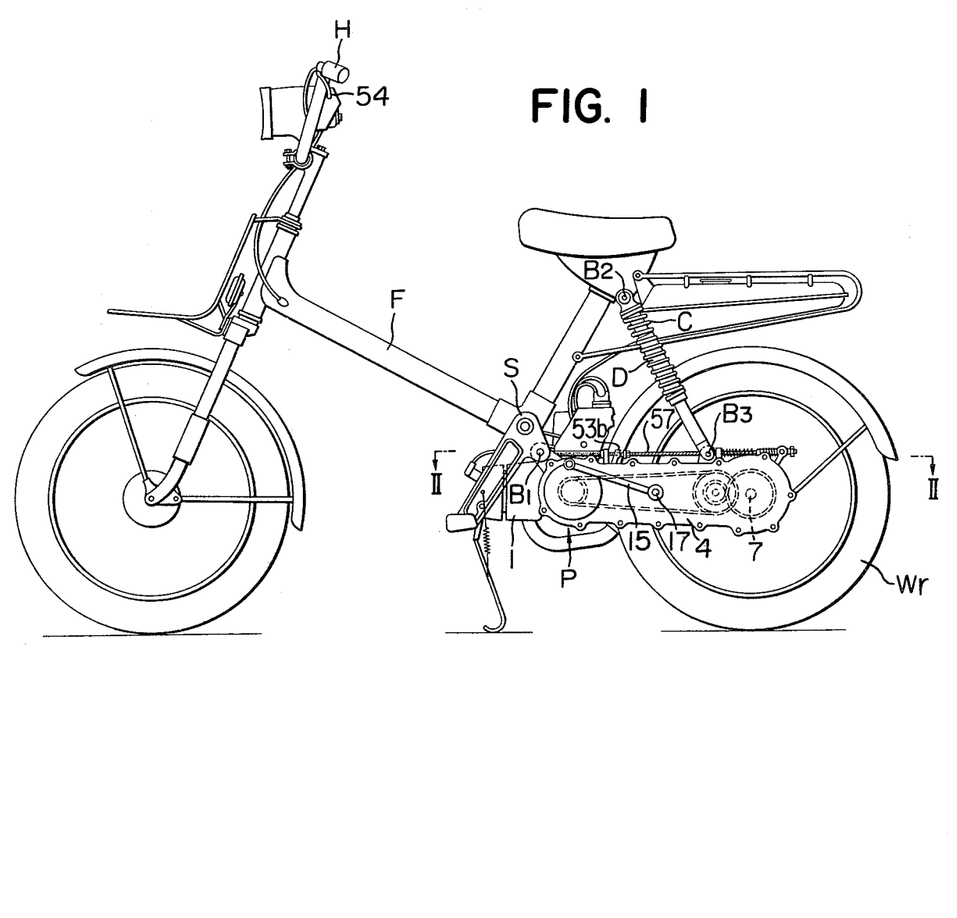
FIG. 1 is a general side elevational view of a motor-cycle, on which the power unit according to the present invention is mounted.
Figure 2:
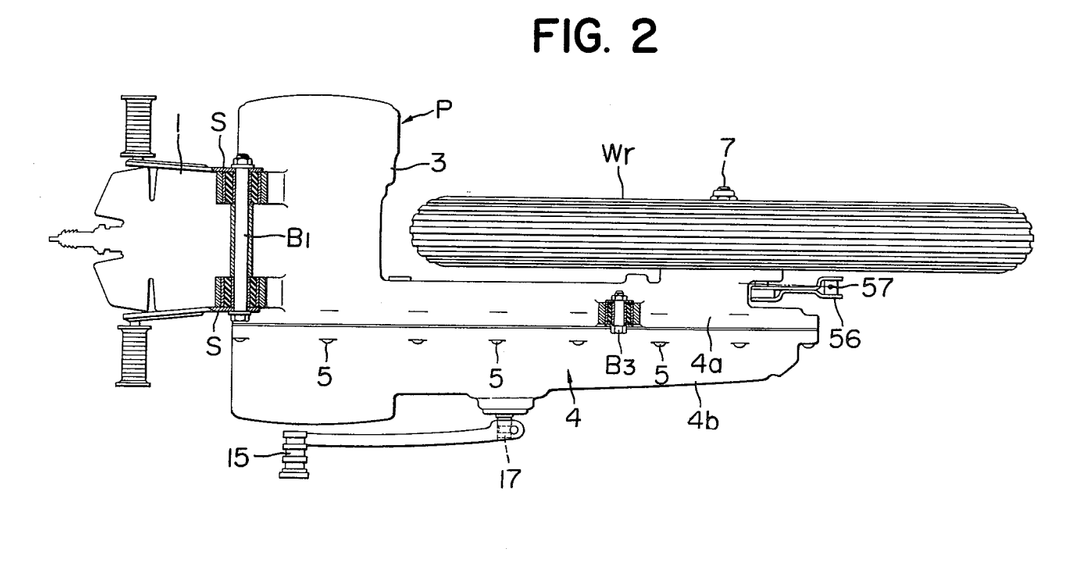
FIG. 2 is a plan view of the power unit according to the present invention taken along the line II—II in FIG. 1.
Figure 3:
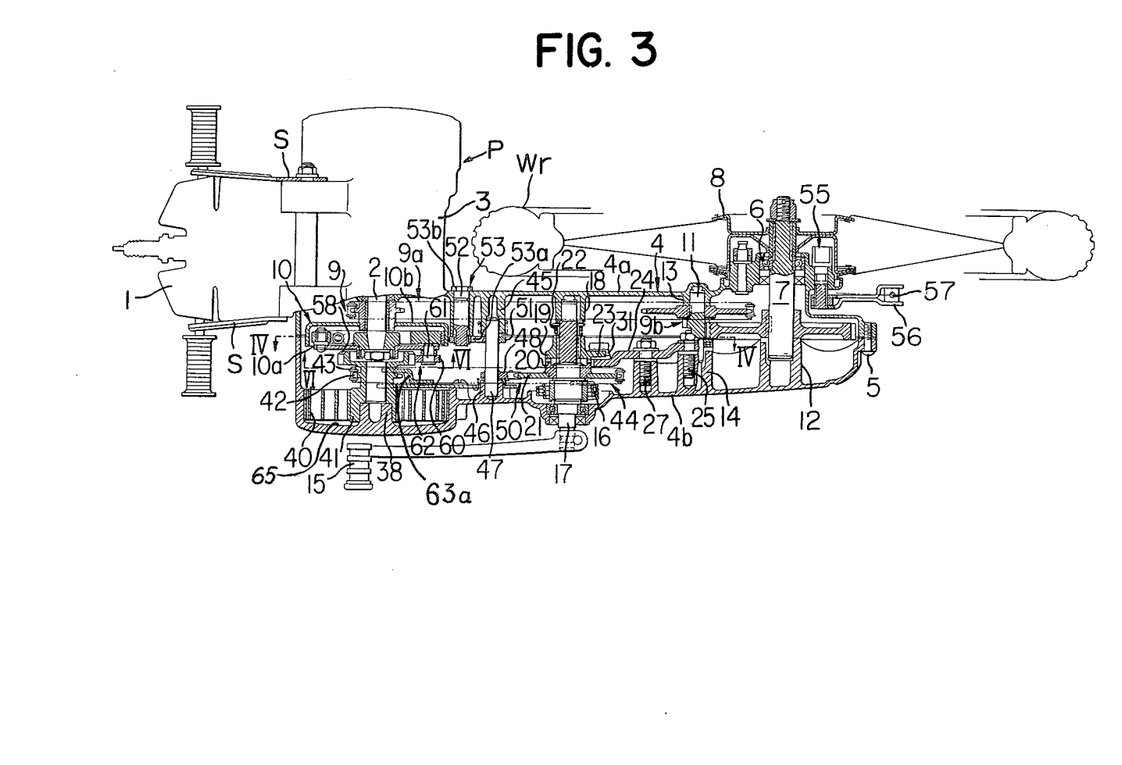
FIG. 3 is a longitudinal cross-sectional view of the main part of the power unit according to the present invention.

The power unit P mainly consists of a motor-cycle engine 1 having a crank shaft 2 which extends in the left and right directions of the motor-cycle, and a power transmission case 4 which integrally and connectively provided at the left end of a crank case 3 of the engine 1, and extends in the rearward direction. The power transmission case 4 is constructed with an inner half $4a$ of the case 4 which is directly connected with the crank case 3, and an outer half $4b$ of the case 4 which is separably connected to the inner half $4a$ by a number of bolts 5, 5, . . . . In this construction of the power transmission case 4, a rear axle 7 is fitted in a freely rotatable manner on the side wall of the rear end of the inner half 4 of the case through a bearing 6, and a hub 8 of a rear wheel W, is spline-connected and fixed to the outer end of the rear axle 7. The inner end of the rear axle 7 is supported, in a manner freely insertable and retractable at the time of both halves 4a and 4b of the case 4 being coupled, on the boss 12 projectively provided on the inner wall of the outer half 4b of the case 4. The driving power transmission mechanism 9 consists of a known centrifugal clutch 10 of an internally expanding type having an input member 10 fixedly secured to an end of the crank shaft 2 and an output member 10b held on the same end thereof in a freely rotatable manner, a primary speed reducing mechanism 9a capable of driving an intermediate power transmission shaft 11 at a reduced speed from the output member 10b, and a second speed reducing mechanism 9b capable of driving the rear axle 7 at a reduced speed from the intermediate power transmission shaft 11. The abovementioned intermediate power transmission shaft 11 is supported at both ends thereof by bosses 13 and 14 projectively provided on the inner wall of the inner and outer halves 4a and 4b of the case 4.

On the side wall at the center part of the outer half 4b of the case 4, there is fitted a pedal shaft 17 which is subjected to swing motions in the directions of arrows a and b by a pressing-down force to be imparted to the engine starting pedal 15 and a distortional torque of a coil-shaped return spring 16. The inner end of the pedal shaft 17 is supported in a freely insertable and retractable manner into and from a base 18 of the inner half 4a of the case 4 at the time of coupling both inner and outer halves 4a and 4b of the case 4.

Figure 4:
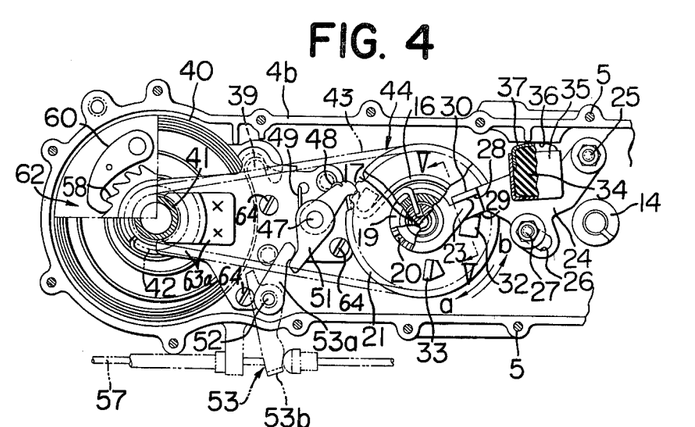
FIG. 4 is a cross-sectional view taken along the line IV—IV in FIG. 3.
Figure 5:
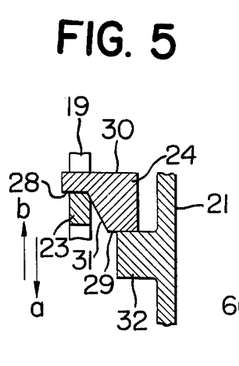
FIG. 5 is a cross-sectional view taken along the line V—V in FIG. 5.
Figure 6:
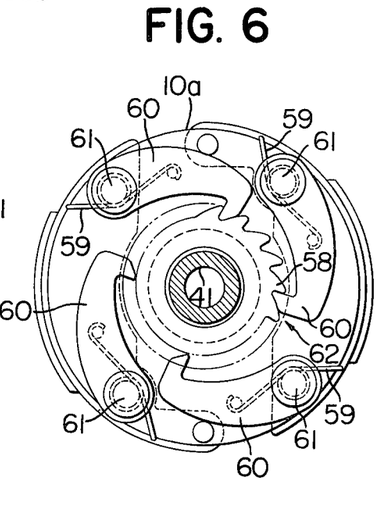
FIG. 6 is an enlarged cross-sectional view taken along the line VI—VI in FIG. 3.
Figure 7:
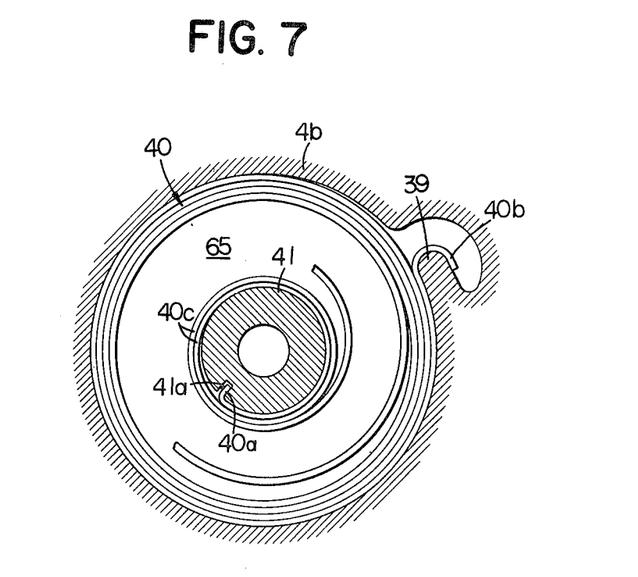
FIG. 7 is an enlarged cross-sectional view showing spiral spring for starting the motor-cycle engine, when it is disposed at its designated position.

At an intermediate part of the pedal shaft 17, a driving clutch member 19 is spline-connected in a freely slidable manner at one side thereof, while a driven clutch member 20 having, as an integral part thereof, a driving sprocket 21 of a relatively large diameter on its outer periphery is supported at the other side thereof in a freely rotatable manner. These driving and driven clutch members 19 and 20 constitute a clutch set to be meshed with each other, in which the driving clutch member 19 is energized in the engaging direction, i.e., to the side of the driven clutch member 20, by a clutch spring 22. The driving clutch member 19 has, as an integral part thereof, an actuating arm 23 which projects in the radial direction, and this actuating arm is engaged with a control plate 24. The control plate 24 is supported at its base end thereof on the inner wall of the outer half 4b of the case 4 by a pivot shaft 25 in a freely oscillatable manner. A stopper pin 27 fixedly secured to the outer half 4b of the case 4 is engaged with a long hole in an arcuate shape which is formed in one part of the control plate 24. At one extreme end of the control plate 24, there are formed a first stopper surface 28 which is capable of contacting with a side surface of the actuating arm 23 to restrict a return position of the pedal shaft 17 due to distortional torque of the return spring 16, a cam surface 31 which is bent from one side of the stopper surface 28 to the direction of the driving sprocket 21 so as to control movement of the actuating arm 23 to the side of the driving sprocket 21 due to resilient spring force of the clutch spring 21, a second stopper surface 29 which is capable of contacting a first projection 32 projectively provided on the side surface of the driving sprocket 21 so as to determine the starting point of rotation of the driving sprocket 21 in the direction of the arrow a, and a third stopper surface 30 which is capable of contacting with a second projection 33 projectively provided on the side surface of the driving sprocket 21 so as to determine the terminating point of rotation of the driving sprocket 21 in the direction of the arrow a. Further, a buffer cylinder 35, which is filled therein with an elastic buffer material 34 such as rubber, etc., is fixedly provided on the control plate 24. At the open end of this buffer cylinder 35, there is fitted, in a freely slidable manner, a cup-shaped member 37 which covers the free surface of the buffer material 34 and faces the contact surface 36 of the outer half 4b of the case 4. On the outer half 4b of the case 4, there is integrally formed a supporting shaft 38 on the same axial line as that of the crank shaft 2. An engine starting shaft 41 is fitted onto this supporting shaft 38 in a freely rotatable manner. A hook-shaped inner end 40a of the spiral spring 40 is engaged in a concave groove 41a at one side of the engine starting shaft 41, and, at the same time, the hook-shaped outer end 40b thereof is engaged with an engaging pawl 39 on the inner wall of the outer half 4b of the case 4. The spiral spring 40 is so designed that at least a single winding (in the embodiment shown in FIG. 7, it is wound twice) around the inner peripheral part thereof is formed on a shrinkage part 40c to tightly squeeze the engine starting shaft 41 by its own squeezing force, and the other portion of the spring is imparted a tension in the expanding direction thereof so that the spring force may be accumulated when it is wound around the engine starting shaft 41. In consequence of this, at the time of releasing the accumulated spring force from the spiral spring 40, the rotational force of the engine starting shaft 41 due to the inertial acts on this spiral spring 40 as reverse rotational force. However, as the shinkage stress at the shinkage part 40c of the spiral spring 40 which tightly squeezes the starting shaft 41 absorbs the abovementioned reverse rotational force, the breakage of the spring as well as separation thereof from the concave groove 41a can be prevented.

On the outer periphery of the engine starting shaft 41, there is integrally formed a driven sprocket 42 having a smaller diameter than that of the afore-described driving sprocket 21, and a power transmission chain 43 is extended between the driving and driven sprockets 21 and 42. In this manner, the driving sprocket 21, the driven sprocket 42, and the power transmission chain 43 constitute the starting power transmission mechanism 44.

At an intermediate position between the driving sprocket 21 and the driven sprocket 42, a supporting plate 63 is fixedly secured to the inner wall of the outer half 4b of the case 4 by a threaded screw 64 so as to support substantially half of the peripheral surface of the intermediate portion of the engine starting shaft 41 at a fork portion 63a bridging the driven sprocket 42, whereby the engine starting shaft 41 can be prevented from inclination or off-centering due to the tension imparted thereto by the power transmission chain 43, and, at the same time, its movement in the axial direction can be restricted. Moreover, as this supporting plate 63 crosses over the open surface of the housing 65 accommodating therein the spiral spring 40, it has the function of suppressing protrusion of the spiral spring 40.

At an intermediate position between the pedal shaft 17 and the engine starting shaft 41, there is fixedly provided a ratchet pawl 48 which is engaged with and disengaged from the outer peripheral teeth of the driving sprocket 21 on a pivot shaft 47 to be supported in a rotatable manner on the bosses 45 and 46 of the inner and outer halves 4a and 4b of the case 4, respectively. The ratchet pawl 48 is energized by the distortional coil spring 49 in the engaging direction thereof with the abovementioned outer peripheral teeth. Thus, the ratchet pawl 48 and the distortional spring 49 constitute an intermittent forwarding mechanism 50 which permits the driving sprocket 21 to rotate in the direction of the arrow a, and opposes rotation in the direction of the arrow mark b. Furthermore, a release lever 51 is fixedly provided on the pivot shaft 47, and an inner lever 53a of a bell crank lever 53 which is pivotally supported on the inner half 4a of the case 4 is engaged with the lever 51. An outer lever 53b of the bell crank lever 53 is connected at a position half way on a brake wire 57 which connects a brake operating lever 54 provided on a steering handle H of the motor-cycle and an actuating lever 56 of the known brake mechanism 55 of the internal expanding type incorporated in the hub 8 of the rear wheel $W_r$. The pivot shaft 47 is fitted at one end thereof into the boss 46 of the outer half 4b of the case 4, while it is fitted, at the other end thereof, into the boss 45 of the inner half 4a of the case 4 when both inner and outer halves 4a and 4b are coupled, and, at the same time, the release lever 51 and the inner lever 53a of the bell crank lever 53 are mutually engaged.

A ratchet wheel 58 is integrally formed at a side end part of the centrifugal clutch 10 of the engine starting shaft 41, while a plurality of ratchet pawls 60, 60, . . . to be energized in the inward direction by springs 59, 59, . . . are supported on the input member 10a of the centrifugal clutch 10 by pivot shafts 61, 61, . . . in a freely oscillatable manner. These ratchet pawls 60, 60, . . . and the ratchet wheel 58 are engaged with each other at the time of coupling of both inner and outer halves 4a and 4b of the case 4 to thereby constitute the over-running clutch 62 for starting.

In the following description, the functions and operations of the power unit according to the present invention will be explained with reference to the illustrated embodiment.

At the time of starting the engine 1, pressing action of the engine starting pedal 15 is repeated to thereby impart to the pedal shaft 17 a plurality of swing motions on the pivot of the supporting shaft 22, at the outer end of which the pedal shaft is fitted. Thus, according to the swing motion of the pedal shaft 17 in the direction of the arrow a due to the pressing operation of the engine starting pedal 15, the actuating arm 23 of the driving clutch member 19 which constantly rotates along with the pedal shaft 17 shifts to a lower position or level of the cam surface 31 on the control plate 24, and, along with this shifting of the actuating arm 23, the driving clutch member 19 is advanced by the spring force of the clutch spring 22 to be engaged with the driven clutch member 20 with the consequence that the subsequent swing motion of the pedal shaft 17 in the direction of the arrow a is transmitted to the driving sprocket 21 through both driving and driven clutch members 19 and 20, and further to the power transmitting chain 43 and the driven sprocket 42. As the result of this transmission of the rotational force, the engine starting shaft 41 is rotated and the spiral spring 40 is wound around this engine starting shaft 41, whereby the driving force is accumulated in the spring.

Further, according to the swing motion of the pedal shaft 17 in the direction of the arrow b due to the restitutive force of the return spring 16, since the actuating arm 23 is shifted to a higher position or level of the cam surface, the driving clutch member 19 retracts accordingly against the spring force of the clutch spring 22, whereby the engagement between the driving clutch member 19 and the driven clutch member 20 is released, and the continuous rotation of the pedal shaft 17 in the rotational direction b is not transmitted to the driving sprocket 21. During this period, the ratchet pawl 48 of the intermittent forwarding mechanism 50 is engaged with the bottom or valley of one of the peripheral teeth of the driving sprocket 21 so as to be able to prevent the driving sprocket 21 from rotating in the reverse direction due to the accumulated spring force in the spiral spring 40.

By the repetition of these operations, the driving sprocket 21 is rotated in the direction of the arrow a at a certain definite rotational angle, and, when the second projection 33 provided at one side surface of the driving sprocket 21 contacts the third stopper surface 30 of the control plate 24, the spiral spring 40 is placed in a state of its having an adequate and satisfactory spring force accumulation, by which the pressing operation of the engine starting pedal 15 is completed.

Subsequently, a brake operating lever 54 is operated to pull a brake wire 57, that is, to move the same to the left in FIG. 4, according to which the bell crank lever 53 rotates in the clockwise direction in FIG. 4 to cause the release lever 51 to oscillate in the counter-clockwise direction to separate the ratchet pawl 48 from the center peripheral teeth of the driving sprocket 21 to liberate the driving sprocket 21. On account of this, the spiral spring 40 releases its accumulated force at once, the powerful rotational torque of which acts on the crank shaft 2 through the starting shaft 41 and the over-running clutch 62, whereby the engine 1 is subjected to the cranking action and starts.

After start of the engine, when the rotational speed of the crank shaft 2 surpasses the rotational speed of the starting shaft 41 due to accumulated force of the spiral spring 40, the ratchet pawls 60, 60, . . . of the over-running clutch 62 slide on the ratchet wheel 58, and, by the time the crank shaft 2 attains the usual speed of its idling rotation, the ratchet pawls 60, 60, . . . swing outwardly against the set load of the springs 59, 59, . . . due to their centrifugal action, whereby the ratchet pawls are perfectly separated from the ratchet wheel 58. On account of this, there is no possibility such that, in the ordinary operating conditions of the engine 1, the ratchet pawls 60, 60, . . . contact the ratchet wheel 58 to generate noise.

With exertion of this accumulated force from the spiral spring 40, the driving sprocket 21 is subjected to reverse rotation from the side of the driven sprocket 42, i.e., it is given a rotation in the direction of the arrow b. When the first projection 32 integrally formed on one side surface of the driving sprocket 21 contacts the second stopper surface 29 of the control plate 24, the rotation of the driving sprocket 21 is stopped, whereby a residual spring force can be reserved in the spiral spring 40. At this time, also, the control plate 24 receives a part of the accumulated energy in the spiral spring 40 and inertia force of the driving sprocket 21, etc. as the impact force, by the force of which the control plate 24 oscillates upwardly, as shown in FIG. 4, with the pivot shaft 25 as the center, and, at the same time, compresses the buffer material 34 at a position between the buffer cylinder 35 which oscillates along with the control plate 24 and the cup-shaped member 37 abutting with the contact surface 36 of the outer half 4b of the case 4, so that the abovementioned impact force can be tolerated, and each of the component parts can be prevented from damage due to the impact force.

At the time of the start of the engine 1, the brake mechanism 55 is brought to an actuated condition by the traction of the brake wire 57 as mentioned above with the result that the rotational speed of the crank shaft 2 abruptly increases to connect the centrifugal clutch 10, hence, even if an output from the crank shaft reaches the rear axle 7 through the driving power transmission mechanism 9, unexpected running of the motor-cycle can be prevented. Accordingly, at the time of the motor-cycle running, the brake mechanism 55 is, needless to say, released at the outset.

As described in the foregoing, the power unit for a motor-cycle according to the present invention is so constructed that the power transmission case 4 is divided into two portions the inner half 4a of which is directly connected to the crank case 3 of the engine 1 and the outer half 4b which is separably joined with the inner half 4a, the driving power transmission mechanism 9 to drive the rear axle 7 being disposed in the inner half 4a, and the starting power transmission mechanism 44 to start the engine 1 being disposed in the outer half 4b, hence both driving and starting power transmission mechanisms 9 and 44 can be individually assembled and disassembled within the respectively corresponding inner and outer halves 4a and 4b of the case 4, and the assembly and maintenance of the power unit P can be carried out easily and efficiently. And yet, since the driving member and the driven member of the over-running clutch 62 for starting, which are mutually engaged at the time of coupling of both inner and outer halves 4a and 4b of the case, are provided respectively at the opposing end parts of the starting shaft 41 of the starting power transmission mechanism 44 and the crank shaft 2 of the engine 1, the over-running clutch 62 for starting can also serve as a joint for engaging and disengaging the driving member and the driven member along with coupling and separation of the inner and outer halves 4a and 4b of the case 4; hence the overall construction of the power unit becomes simple. Further, since the driving power transmission mechanism 9 in the inner half 4a of the case 4 is disposed adjacent to the crank shaft 2 and the rear wheel $W_r$, no great stresses are produced in the components of the driving power transmission mechanism 9 with the consequence that the motor-cycle can be driven smoothly, and the durability of the power unit is high.

Also, as the inner end of the rear axle 7 fitted to the inner half 4a of the case 4 is supported by the outer half 4b thereof in a freely insertable and retractable manner, and the inner end of the pedal shaft 17 having the engine starting pedal 15 at its outer end and fitted to the outer half 4b of the case 4 is supported by the inner half 4a thereof in a freely insertable and retractable manner, the rear axle 7 and the pedal shaft 17 which are subjected to a particularly large bending load are supported at two points with the consequence that their durability is further improved, and, at the same time, such double-points supporting structure in no way hinders the coupling and separation of both inner and outer halves 4a and 4b of the case 4. It also exhibits other remarkable effects.

Further, as the power unit is so constructed that the spiral spring 40 is wound around the engine starting shaft 41 by the oscillating movement of the pedal shaft 17 to once accumulate the spring force therein, with the accumulated force of which the engine starting shaft 41 is rapidly rotated to crank the engine 1, the motor-cycle engine can be started easily and definitely even by women without requiring them to exert large operating energy. In addition, no expensive component parts such as a starting electric motor and the like are adopted in the power unit, so that the starting device can be provided at a low price.

Moreover, the device according to the present invention is provided with the control plate 24 which is capable of restricting the winding quantity and unwinding quantity of the spiral spring 40 to a definite extent by regulating the range of rotation of the driving sprocket 21 which is interlocked with the starting shaft 41. As the result of this, the spiral spring 40 can be prevented from excessive winding and breakage due to the reverse rotation of the driving sprocket before they take place. At the same time, a reserved tension can usually be given to the spiral spring 40, which contributes to reduction in the number of pressing operations of the engine starting pedal for accumulation of the force in the spiral spring 40.

In addition, since the control plate 24 is supported on the power transmission case 4 through the buffer material 34 so as to absorb the shock or impact to occur at the time of limiting the unwinding quantity of the spiral spring 40, the breakage of the spring and separation of its hook-shaped ends from their fixing points as already mentioned in the foregoing can be successfully prevented, hence the durability of the device becomes very high.

Furthermore, since the buffer member 34 is subjected to limitation in its compressive deformation in a chamber to be defined by the buffer cylinder 35 and the cup-shaped member 37 to be slidably engaged with the cylinder, it can withstand a high compressive force and can exhibit very effective and favorable buffer effect to the spiral spring 40 over a long period of time.

Moreover, the over-running clutch 62 for starting is constructed with the ratchet wheel 58 provided on the starting shaft 41 connected to the force accumulating source of the spiral spring 40, and the ratchet pawls 60, 60, . . . provided on the side of the crank shaft 2 of the engine 1, and, the ratchet pawls 60, 60, . . . are made to be separated from their engaging positions with the ratchet wheel 58 by the centrifugal force when the rotational speed of the crank shaft 2 exceeds a predetermined value. With such construction of the device, the engine 1 does not create any frictional resistance by the sliding action of the over-running clutch 62 at the time of the force accumulating operation, so that the operation can be performed lightly, and yet, after start of the engine, a completely separated state of the over-running clutch 62 can be attained, whereby the transmission of the reverse load from the crank shaft 2 to the engine starting shaft 41 can be prevented without failure and without accompanying any noise. Also, since the aforementioned ratchet pawls 60, 60, . . . do not bring about any problem in their engagement with the ratchet wheel 58, even if the ratchet wheel 58 performs a slightly eccentric motion, no inconvenience whatsoever is encountered even when there is an error to a slight extent in the coaxial positioning of the crank shaft 2 and the engine starting shaft 41, hence great advantages are afforded in the manufacture of the device owing to broadening of the permissible range of allowance in the machining errors and the assembling errors as well.

Further, the input member 10a of the clutch for intermittent power transmission which is usually provided on the crank shaft 2 is also used for the fitting base plate of the above-mentioned ratchet pawls 60, 60, . . ., the construction of the device can be made simple.

Thus, according to the present invention, very effective construction of the power unit for the motor-cycles can be provided on the basis of the preferred embodiments thereof. It should however be understood that the present invention is not restricted to the embodiments shown in the drawing, but any changes and modifications may be made by those skilled in the art without departing from the spirit and scope of the invention as set forth in the appended claims.

What is claimed is:

1. A power unit for a motor-cycle of a type, in which a power transmission case (4) supporting at the rear end thereof a rear axle (7) is integrally joined together at one end of a crank case (3) of an engine 1, said power transmission case (4) being constituted by an inner half (4a) directly connected to said crank case (3) and an outer half (4b) separably connected to said inner half (4a); said rear axle (7) being fitted onto said inner half (4a) of the power transmission case (4), a driving power transmission mechanism (9) disposed in said inner half to connect said rear axle (7) and a crank shaft (2) of said engine (1); a pedal shaft (17) having an engine starting pedal (15) connected at one end thereof, and an engine starting shaft (41) adjacent to said crank shaft (2) and axially aligned therewith fitted onto said outer half (4b) of the power transmission case (4), a starting power transmission mechanism (44) disposed in said outer half to connect said crank shaft (2) and said engine starting shaft (41); and a driving member and a driven member of an over-running clutch (62) for starting engaged with one another at the time of coupling said inner and outer halves (4a) and (4b) of the power transmission case (4), said driving and driven members being provided at the opposing ends of each of said starting shaft (41) and said crank shaft (2).

2. The power unit for a motor-cycle as set forth in claim 1, in which the inner end of said rear axle (7) is supported on said outer half (4b) of the power transmission case (4) in a freely insertable and retractable manner, and the inner end of said pedal shaft (17) is supported on said inner half (4a) of the power transmission case (4).

3. The power unit for a motor-cycle as set forth in claim 1, in which said starting power transmission mechanism (44) comprises a driving sprocket (21) spline-connected to said pedal shaft (17), a driven sprocket (42) integrally formed on the outer periphery of said starting shaft (41), and a chain (43) extended between said driving sprocket (21) and driven sprocket (42).

4. The power unit for a motor-cycle as set forth in claim 3, comprising a spiral spring (40) for engine cranking connected at one end with said starting shaft (41) and at the other end with said transmission case (4), and an intermittent forwarding mechanism (50) between said pedal shaft (17) and said driving sprocket (21), said mechanism being operable to cause the rotation of said driving sprocket (21) in a direction to wind up said spiral spring (40) for accumulation of energy in response to oscillating motions of said pedal shaft (17) while intentionally rendered inoperative to permit the release of the energy accumulated in said spiral spring (40) to thereby rotate said starting shaft (41) for engine cranking, and a control plate (24) secured to said power transmission case 4 through a buffer member (34) so as to restrict the winding and unwinding quantity of said spiral spring (40) by engagement thereof with projections (32, 33) provided on one side of said driving sprocket (21), said buffer member serving to absorb an impact occurring upon such engagement between said buffer member and projections.

5. The power unit for a motor-cycle as set forth in claim 4, in which said buffer member (34) is accommodated within a buffer cylinder (35) fixedly provided on said control plate (24), and a cup-shaped member (37) which contacts one of said power transmission case (4) and a fixed part connected to said power transmission case (4), when said control plate (24) is oscillated by said driving sprocket (21) mounted on one open end of said buffer cylinder (35).

6. The power unit for a motor-cycle as set forth in claim 4, in which said over-running clutch (62) for starting the motor-cycle comprises a ratchet wheel 58 provided on said starting shaft 41 and ratchet pawls (60, 60) pivoted in a freely swingable manner in the radial direction of an input member (10a) of a clutch on said crank shaft (2) for connecting and disconnecting the driving power, so that, when the rotational speed of said crank shaft (2) exceeds a predetermined value, said ratchet pawls (60, 60) are separated from their engaged positions with said ratchet wheel (58) due to centrifugal force.

7. The power unit for a motor-cycle as set forth in claim 4, in which said intermittent forwarding mechanism (50) comprises a ratchet pawl (48) fixedly secured to a pivot shaft (47) to be supported in a freely rotatable manner relative to bosses (45, 46) provided on said both inner and outer halves (4a) and (4b) of the power transmission case (4), and a spring (49) which energizes said ratchet pawl (48) in such a manner that it may be engaged with outer peripheral teeth of said driving sprocket (21).

8. The power unit for a motor-cycle as set forth in claim 6, in which said clutch for connecting and disconnecting the driving power from the engine comprises a centrifugal clutch (10) of an internally expanding type.

* * * * *